Jan. 19, 1932.  F. FRASER  1,841,579
METHOD AND APPARATUS FOR PRODUCING SHEET GLASS
Filed March 10, 1930
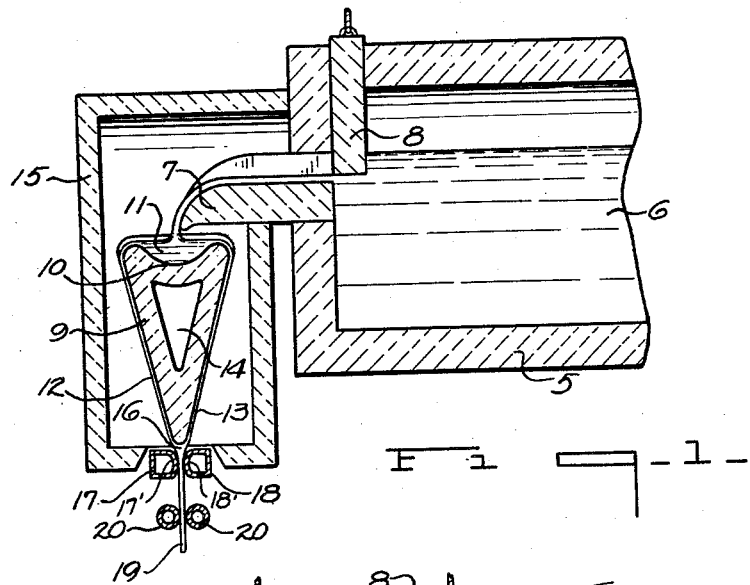
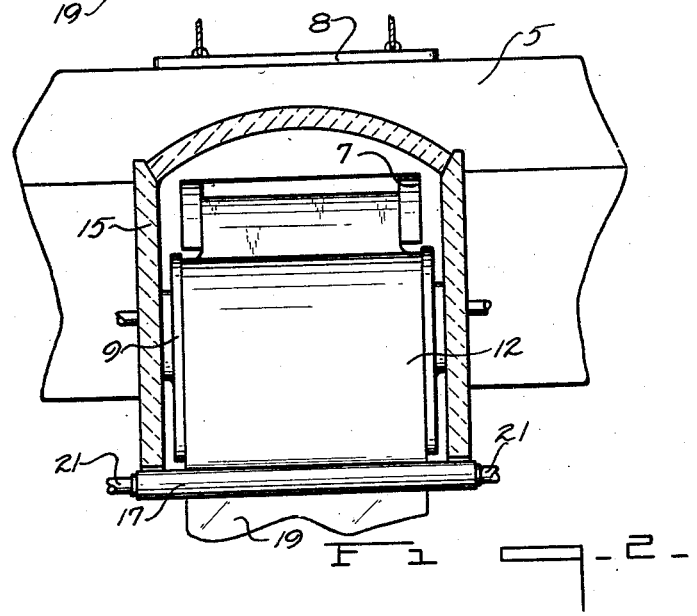
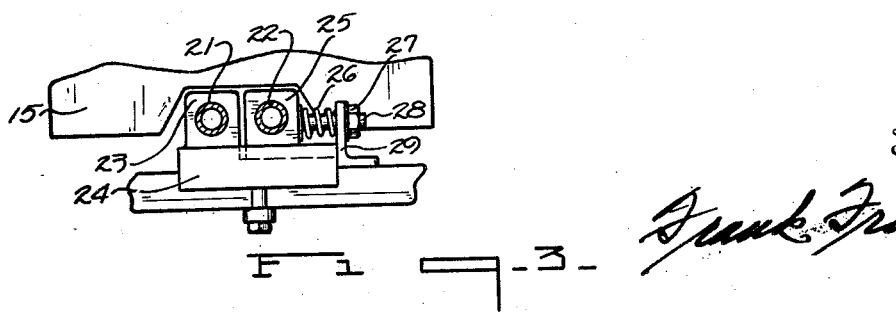
Inventor
Frank Fraser Patented Jan. 19, 1932

1,841,579

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed March 10, 1930. Serial No. 434,513.

The present invention relates to a method and apparatus for producing sheet glass.

This invention is particularly well adapted for, although not necessarily limited to, use in connection with that process for forming sheet glass wherein the glass is flowed downwardly from a molten bath in a plurality of streams or films over and in contact with the opposite surfaces of a stationary slab or directing member, the streams or films being united at the lower end of the slab and drawn away therefrom in sheet form. In such process, the thickness of the sheet produced has ordinarily been determined by the viscosity and temperature conditions of the glass and the speed at which it is flowed downwardly. Thus, no means has been provided for effecting an actual reduction of the glass after it leaves the slab so as to reduce it to a sheet of substantially predetermined and uniform thickness. In addition, during the passage of the films or streams down opposite surfaces of the slab and the subsequent drawing away of these films in sheet form, there is a tendency for waves and other surface defects or irregularities to be created therein, which condition is obviously an undesirable one.

An important object of the invention is the provision of a method and apparatus wherein the united films or streams of glass, upon leaving the slab or directing member, are reduced by a positive pressing or reducing action to a sheet of substantially predetermined and uniform thickness.

Another object of the invention is the provision of a method and apparatus for removing surface defects or irregularities in the glass as it leaves the slab so that a flatter and smoother sheet may be produced.

A further object of the invention is to provide an apparatus embodying means positioned to engage opposite surfaces of the glass at substantially the point where the streams or films unite upon leaving the slab, said means acting not only to reduce the glass to a sheet of substantially predetermined and uniform thickness but further producing a wiping or smoothing action thereupon to flatten or iron out any surface irregularities present therein.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus provided by the present invention, Fig. 2 is an elevation thereof, partially in section, and Fig. 3 is an elevation showing a part of the structural details.

In the drawings, 5 designates the exit end of a tank furnace adapted to contain a mass of suitably refined molten glass 6. The furnace 5 is provided at one end with an overflow lip 7 and the amount of glass flowing over this lip can be controlled by the vertically adjustable gate or shear-cake 8. Arranged beneath the overflow lip 7 is a substantially vertically arranged slab or directing member 9 having a trough 10 in its upper end for receiving the supply of molten glass 11 therein. The slab 9 is provided with downwardly converging sides and the molten glass is adapted to overflow from trough 10 and to flow down the opposite surfaces of the slab in the form of relatively thin streams or films 12 and 13. The temperature of the slab and the glass thereupon may be regulated by providing a passage or the like 14 within the slab through which may be circulated a suitable temperature control medium, and further by enclosing said slab within a temperature controlled chamber 15. As the separate films or streams of molten glass 12 and 13 leave the lower end of the slab, they merge or join as at 16 to form a single body of glass which is relatively thicker than that desired of the finished sheet.

Heretofore, the sheet has ordinarily been formed by simply drawing or stretching the relatively heavy body of glass 16 longitudinally with the thickness of said sheet being determined by the temperature and viscosity of the glass and the speed at which the glass is drawn. According to the present invention, however, means is provided for not only reducing the glass as it leaves the slab to a sheet of substantially predetermined thickness, but also for smoothing or flattening out any surface irregularities therein, to the end that a flatter, smoother and more uniform thickness of sheet may be produced.

The means herein provided for this purpose comprises a pair of stationary preferably metallic members 17 and 18 positioned to engage opposite surfaces of the glass at the juncture of the two downwardly flowing streams 12 and 13 or, in other words, at the point 16. These members are in the form of substantially rectangular hollow casings which extend the entire width of the slab and are adapted to be internally cooled by the circulation of a suitable cooling medium therethrough such as water, air etc. The members 17 and 18, or at least those portions contacting with the glass, are preferably constructed from a suitable non-corrosive material such as nickel, nichrome, monel or the like which will receive and retain a high polish. Also, the inner adjacent side walls of the members are preferably arcuately curved transversely and outwardly as at 17' and 18' to reduce the area of contact between said members and the glass.

The space between the members 17 and 18 constitutes, in effect, a sheet forming pass and the glass 16 passing therethrough is reduced by a positive pressing or reducing action to a sheet 19 of substantially predetermined and uniform thickness, said sheet being carried away by a plurality of pairs of conveyor rolls 20, only one pair of which is shown, or by any other suitable means. The sheet may be annealed while traveling downwardly or may be deflected into a horizontal plane and annealed while traveling horizontally. The members 17 and 18 also produce a wiping or smoothing action on the glass so as to flatten or iron out any irregularities in the surfaces thereof to the end that a sheet of better quality and relatively free from surface defects may be had.

As illustrated in Fig. 3, the members 17 and 18 may be provided at opposite ends with the tubular extensions 21 and 22 respectively, the extension 21 at each end of member 17 being carried by a support 23 fixedly secured to a base member 24, while the extension 22 at each end of member 18 is carried by a support 25 slidably mounted upon base 24 and normally urged toward support 23 by the provision of a compression spring 26. These springs are provided to normally urge the members 17 and 18 toward one another but are of such a nature that the members can be readily separated to provide for the passage of clay or other foreign matter therebetween and thus prevent injury thereto. The distance between the two members is controlled by the provision of nuts 27 threaded upon bolts 28 carried by the supports 25 at opposite ends of member 18 and projecting outwardly through fixed brackets 29. The tubular extensions 21 and 22 facilitate the introduction of the cooling medium into the members 17 and 18 and its subsequent discharge therefrom.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass apparatus, the combination with a substantially vertically arranged slab adapted to receive molten glass upon the top thereof and having downwardly converging sides over and down which the glass flows in stream form, with the streams uniting at the lower end thereof, of stationary means engaging the glass at substantially the juncture of the two streams for reducing it to a sheet of substantially predetermined thickness whereby the sheet formed is of a thickness relatively less than the combined thickness of the individual streams.

2. In glass apparatus, the combination with a substantially vertically arranged slab adapted to receive molten glass upon the top thereof and having downwardly converging sides over and down which the glass flows in stream form, with the streams uniting at the lower end thereof, of a pair of stationary members engaging opposite surfaces of the glass simultaneously at substantially the juncture of the two streams, said members being spaced to create a sheet forming pass through which the glass is moved and reduced to a sheet of substantially predetermined thickness whereby the sheet formed is of a thickness relatively less than the combined thickness of the individual streams.

3. In a glass apparatus, the combination with a substantially vertically arranged slab adapted to receive molten glass upon the top thereof and having downwardly converging sides over and down which the glass flows in stream form, with the streams uniting at the lower end thereof, of means engaging the glass at substantially the juncture of the two streams for producing a wiping action thereon to smooth or iron out irregularities in the surfaces thereof.

4. In glass apparatus, the combination with a substantially vertically arranged slab adapted to receive molten glass upon the top thereof and having downwardly converging sides over and down which the glass flows in stream form, with the streams uniting at the lower end thereof, of substantially horizontally aligned stationary members engaging opposite surfaces of the glass at substantially the juncture of the two streams and producing a wiping action thereon to smooth or iron out surface irregularities therein.

5. In glass apparatus, the combination with a substantially vertically arranged slab adapted to receive molten glass upon the top thereof and having downwardly converging sides over and down which the glass flows in stream form, with the streams uniting at the lower end thereof, of substantially horizontally aligned stationary members engaging opposite surfaces of the glass at substantially the juncture of the two streams, for reducing it to a sheet of substantially predetermined thickness and for also producing a wiping or smoothing action thereupon to flatten or iron out irregularities in the surfaces thereof whereby the sheet formed is of a thickness relatively less than the combined thickness of the individual streams, said members being in the form of substantially rectangular hollow casings through which is adapted to be circulated a temperature control medium, the adjacent side walls of said members being arcuately curved transversely and outwardly.

6. In the method of producing sheet glass wherein a plurality of streams of glass are flowed downwardly over a directing member and united at the lower end thereof, the step of reducing the glass as it leaves the directing member to a sheet of substantially predetermined and uniform thickness by passing it through a sheet forming pass defined by stationary surfaces whereby the sheet formed is of a thickness relatively less than the combined thickness of the individual streams.

7. In the method of producing sheet glass wherein a plurality of streams of glass are flowed downwardly over a directing member and united at the lower end thereof, the step of passing the glass as it leaves the directing member into contact with stationary surfaces which have a wiping or smoothing effect thereupon to remove irregularities in the surfaces thereof.

8. In the method of producing sheet glass wherein a plurality of streams of glass are flowed downwardly over a directing member and united at the lower end thereof, the steps of reducing the glass as it leaves the directing member to a sheet of substantially predetermined and uniform thickness, and simultaneously subjecting opposite surfaces of the glass to a wiping or smoothing action to remove surface irregularities therein whereby the sheet formed is of a thickness relatively less than the combined thickness of the individual streams.

Signed at Toledo, in the county of Lucas and State of Ohio, this 7th day of March, 1930.

FRANK FRASER.